United States Patent [19]
Sugiura et al.

[11] Patent Number: 6,130,872
[45] Date of Patent: Oct. 10, 2000

[54] OPTICAL PICKUP APPARATUS

[75] Inventors: Satoshi Sugiura; Akihiro Tachibana; Yoshihisa Kubota, all of Tsurugashima, Japan

[73] Assignee: Pioneer Electronic Corporation, Tokyo, Japan

[21] Appl. No.: 09/081,982

[22] Filed: May 20, 1998

[30] Foreign Application Priority Data

May 22, 1997 [JP] Japan .................................. 9-132185

[51] Int. Cl.[7] ....................................................... G11B 7/00
[52] U.S. Cl. ............................................ 369/109; 369/112
[58] Field of Search ................................ 369/44.37, 103, 369/109, 112, 110, 44.23, 44.24

[56] References Cited

U.S. PATENT DOCUMENTS

| | | | |
|---|---|---|---|
| 5,412,631 | 5/1995 | Komma et al. | 369/109 |
| 5,495,461 | 2/1996 | Komma et al. | 369/109 |
| 5,500,846 | 3/1996 | Ophey | 369/44.14 |
| 5,659,533 | 8/1997 | Chen et al. | 369/109 |
| 5,677,902 | 10/1997 | Brazas, Jr. | 369/109 |
| 5,696,749 | 12/1997 | Brazas et al. | 369/106 |
| 5,717,674 | 2/1998 | Mori et al. | 369/109 |
| 5,757,754 | 5/1998 | Yamamoto et al. | 369/109 |
| 5,894,464 | 12/1993 | Kim et al. | 369/109 |
| 5,896,360 | 6/1996 | Horimai | 369/44.37 |

OTHER PUBLICATIONS

Japanese Patent No.: 2532818, (KoKai No. Hei 7–98431) and English translation of the Abstract.

*Primary Examiner*—Nabil Hindi
*Attorney, Agent, or Firm*—Perman & Green, LLP

[57] ABSTRACT

An optical pickup apparatus which can be designed compact while having a plurality of semiconductor lasers. The optical pickup apparatus, which reads recorded information from an optical recording medium, comprises an optical system including light intensity detection means having a quarter-split light receiving surface, two semiconductor lasers for emitting light beams of different wavelengths, an objective lens for directing each of the light beams onto an optical recording medium to form a light spot on a recording surface, and first and second holographic optical elements located between the quarter-split light receiving surface and the objective lens, whereby the first holographic optical element eliminates coma aberration and spherical aberration of a light beam of a first wavelength from one of the semiconductor lasers, traveled through the recording surface, thereby generating a predetermined amount of astigmatism, and the second holographic optical element eliminates coma aberration and spherical aberration of a light beam of a second wavelength from the other one of the semiconductor lasers, traveled through the recording surface, thereby generating a predetermined amount of astigmatism.

16 Claims, 14 Drawing Sheets

OPTICAL PICKUP APPARATUS

BACKGROUND OF THE INVENTION

1. Field of the Invention

The present invention relates to an optical pickup in an optical recording and reproducing apparatus.

2. Description of Related Art

Optical recording and reproducing apparatuses include an optical disk player which reads recorded information from an optical recording medium or an optical disk, such as a so-called LD (Laser Disc), CD (Compact Disc) or DVD (Digital Video Disc). There also is a compatible disk player which reads information from those different kinds of optical disks.

An optical pickup of that compatible disk player like an ordinary one has an optical system which irradiates a light beam to an optical disk and reads return light from the optical disk.

Those optical disks as optical information recording media are designed with different specifications including the numerical aperture NA, the thickness of the substrate and the optimal wavelength of read light. Implementation of an optical pickup for a compatible player for LD, CD and DVD therefore requires that at least two differences in the numerical aperture NA and substrate thickness should be compensated.

For example, a two-focus pickup using a holographic lens (disclosed in Japanese Patent No. 2532818 and Japanese Patent Kokai No. Hei 7-98431) has a composite objective lens, which includes a convex objective lens and a holographic lens, and a diffraction grating with concentric ring-shaped recesses and projections, i.e., diffraction grooves, provided on a transparent plate of the holographic lens, and the performance of a concave lens is imparted on this transparent plate to form a focal point on the recording surface in accordance with each optical disk. At this time, the light beam directly passes through the area where the diffraction grooves are not formed, and converges, together with the zero-order diffraction light, onto the objective lens, resulting in differences in numerical aperture between the transmitted an light and the zero-order diffraction light and the first-order diffraction light. The first-order diffraction light that has been diffracted by the diffraction grooves is used to read information from a CD which has a small numerical aperture, and the transmitted light and the zero-order diffraction light which have larger numerical apertures are used to read information from a DVD.

This conventional compatible player is designed to form read spots by means of a single, common light source. Generally, a light source which launches read light having a wavelength of 650 nm suitable for reproduction of a DVD is also used to play back a CD. To play back a CD-R (CD Recordable or R-CD (Recordable CD)), which can be written once by a light source with a wavelength of 780 nm, by using this read light, therefore, satisfactory reproduction signals cannot be acquired due to the insufficient sensitivity that results from a difference in wavelength.

To realize a compatible player capable of adequately recording and reproducing information on, and from, a CD-R as well as an LD, CD and DVD, it is essential to cope with at least three differences in numerical aperture NA, substrate thickness and the wavelength of the light source in use (780-nm type and 650-nm type). To implement a compatible player for an LD, CD, DVD and CD-R, therefore, it is. necessary to design an optical pickup or head using a light source of multiple wavelengths suitable for the respective disks, not a light source of a single wavelength. Constructing an optical system like a prism or lens using a plurality of light sources, however, complicates and enlarges the whole optical pickup or head.

OBJECT AND SUMMARY OF THE INVENTION

Accordingly, it is an object of the present invention to provide an optical pickup apparatus which can be designed compact and has a holographic optical element suitable for an astigmatism scheme that employs light intensity detection means having a quarter-split light receiving surface.

According to this invention there is provided, an optical pickup apparatus for reading recorded information from an optical recording medium, the optical picjup apparatus including an optical system which comprises:

light intensity detection means having a quarter-split light receiving surface, two semiconductor lasers for emitting light beams of different wavelengths, an objective lens for directing each of the light beams onto an optical recording medium to form a light spot on a recording surface, and first and second holographic optical elements located between the quarter-split light receiving surface and the objective lens, wherein the first holographic optical element eliminates coma aberration and spherical aberration of a light beam of a first wavelength from one of the semiconductor lasers, traveled through the recording surface, thereby generating a predetermined amount of astigmatism, and the second holographic optical element eliminates coma aberration and spherical aberration of a light beam of a second wavelength from the other one of the semiconductor lasers, traveled through the recording surface, thereby generating a predetermined amount of astigmatism.

In the optical pickup apparatus, each of the first and second holographic optical elements further has a lens performance for converging a light beam, traveled through the recording surface, onto the quarter-split light receiving surface.

According to another aspect of the invention, the optical pickup apparatus is characterized in that the first holographic optical element directly passes the light beam of the second wavelength without acting thereon, passes the light beam of the first wavelength launched from the one of the semiconductor lasers, guides zero-order diffraction light of the light beam to the objective lens, diffracts zero-order diffraction light of the first wavelength traveled through the recording surface, and guides first-order diffraction light, acquired by diffraction, to the quarter-split light receiving surface, and the second holographic optical element directly passes the light beam of the first wavelength without acting thereon, passes the light beam of the second wavelength launched from the other semiconductor laser, guides zero-order diffraction light of the light beam to the objective lens, diffracts the zero-order diffraction light of the second wavelength traveled through the recording surface, and guides first-order diffraction light, acquired by diffraction, to the quarter-split light receiving surface.

According to a further aspect of the invention, the optical pickup apparatus is characterized in that the light intensity detection means has a first quarter-split light receiving surface for receiving the light beam of the first wavelength and a second quarter-split light receiving surface for receiving the light beam of the second wavelength;

the first holographic optical element diffracts zero-order diffraction light of the first wavelength traveled through the recording surface, and guides first-order diffraction light acquired by diffraction, to the first quarter-split light receiving surface; and the second holographic optical element diffracts zero-order diffraction light of the second wavelength traveled through the recording surface, and guides first-order diffraction light acquired by diffraction, to the second quarter-split light receiving surface.

According to a still further aspect of the invention, the optical pickup apparatus is characterized in that the second holographic optical element directly passes the light beam of the first wavelength without acting thereon, diffracts the light beam of the second wavelength launched from the other semiconductor laser and guides negative first-order diffraction light of the light beam to the objective lens, diffracts the negative first-order diffraction light of the second wavelength traveled through the recording surface, and guides first-order diffraction light, acquired by diffraction, to the quarter-split light receiving surface.

According to a further aspect of the invention, the optical pickup apparatus is characterized by further comprising an aberration correcting element for correcting aberration included in negative first-order diffraction light acquired by diffracting the light beam of the second wavelength launched from the other semiconductor laser.

According to a further aspect of the invention, the optical pickup apparatus is characterized in that the second holographic optical element directly passes the light beam of the first wavelength without acting thereon, diffracts the light beam of the second wavelength launched from the other semiconductor laser and guides negative first-order diffraction light of the light beam to the objective lens, diffracts the negative first-order diffraction light of the second wavelength traveled through the recording surface, and guides first-order diffraction light, acquired by diffraction, to the second quarter-split light receiving surface.

According to a further aspect of the invention, the optical pickup apparatus may be characterized in that each of the first and second holographic optical elements comprises a diffraction relief formed on a transparent plane-parallel plate and an optical material filled in the diffraction relief and having a dispersion varying according to a wavelength.

According to a further aspect of the invention, the optical pickup apparatus is characterized in that the first and second holographic optical elements comprise first and second diffraction reliefs formed on inner surfaces of a pair of separate transparent plane-parallel plates set apart from each other, and an optical material filled between the first and second diffraction reliefs and having a dispersion varying according to a wavelength.

According a further aspect of the invention, the optical pickup apparatus is characterized in that the first and second holographic optical elements are respectively first and second liquid crystal devices each including a pair of transparent plane-parallel plates, a liquid crystal layer provided between the plane-parallel plates, and transparent electrodes formed on inner surfaces of the plane-parallel plates as patterns of first and second diffraction reliefs, and an electric circuit capable of selectively applying an electric field to the transparent electrodes of the first and second liquid crystal devices is connected to the first and second liquid crystal devices.

According to a further aspect of the invention, the optical pickup apparatus is characterized in that the first and second holographic optical elements are a single liquid crystal device having first and second diffraction reliefs, the single liquid crystal device including a pair of transparent plane-parallel plates, a liquid crystal layer provided between the plane-parallel plates, and transparent electrodes formed in a matrix form on inner surfaces of the plane-parallel plates, and an electric circuit capable of selectively applying an electric field to the transparent electrodes for each of patterns of the first and second diffraction reliefs is connected to the single liquid crystal device.

As this invention can permit light paths to be shared by a holographic optical element common to a plurality of semiconductor lasers, the optical system of the optical pickup can be simplified.

DETAILED DESCRIPTION OF THE PREFERRED EMBODIMENTS

Figure 1:
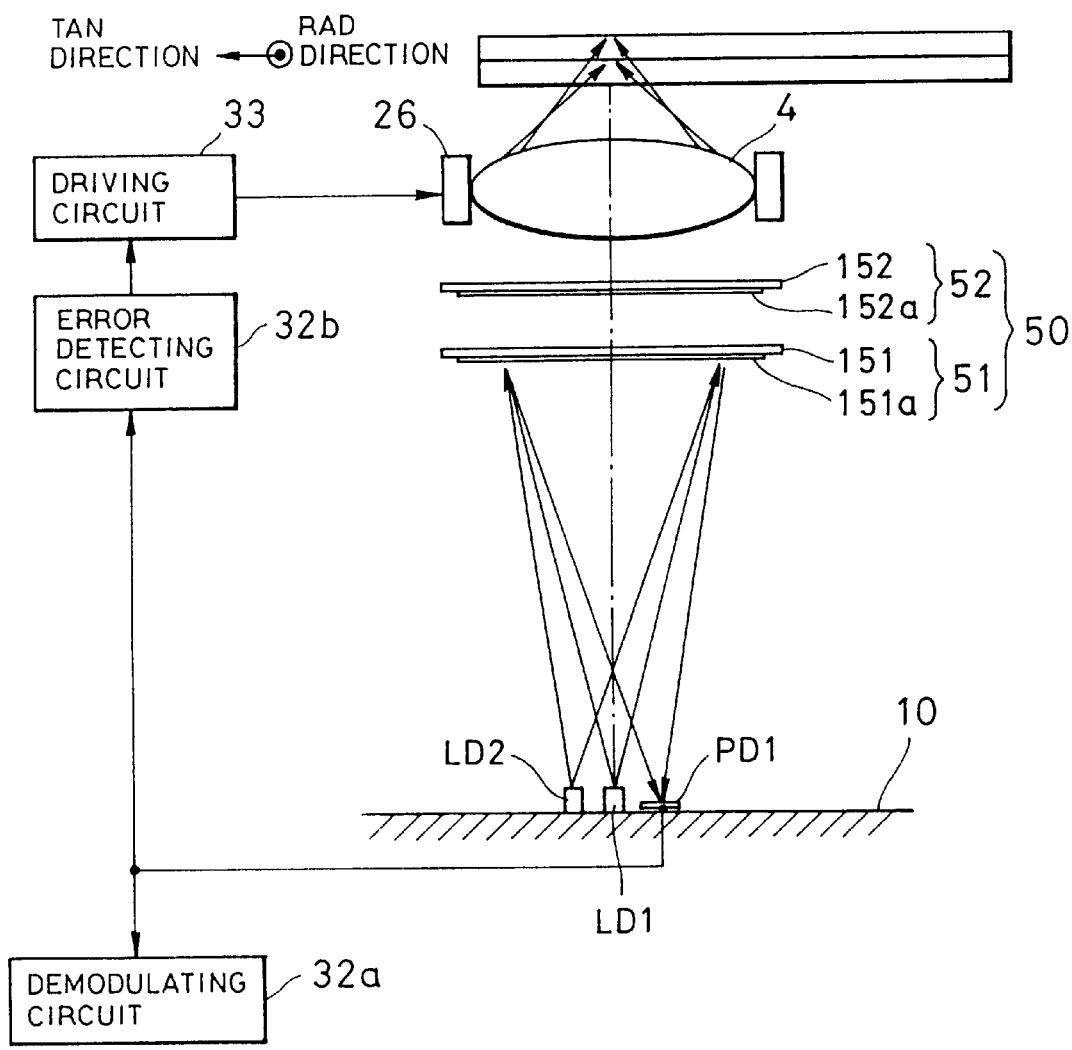
FIG. 1 is a schematic structural diagram showing the interior of an optical pickup apparatus according to a first embodiment of this invention.

Preferred embodiments of this invention will now be described with reference to the accompanying drawings.
First Embodiment FIG. 1 schematically shows an optical pickup of a recording and reproducing apparatus according to a first embodiment. The pickup body accommodates a semiconductor laser LD1 (wavelength of, for example, 650 nm; $\lambda 1$) for reading information from a DVD and a semiconductor laser LD2 (wavelength of, for example, 780 nm; $\lambda 2$) for reading information from a CD, both mounted on a common heat sink (not shown) in such a way as to launch light beams upward. Further provided in the pickup body are a holographic optical element 50, a finite objective lens 4 whose optical axis is common to that of the holographic optical element 50 and which converges a light beam onto an optical disk 5 to form a light spot, and a quarter-split light receiving surface PD1 of a photodetector which receives reflected light from the light spot. The objective lens 4, the holographic optical element 50 and a substrate 10 are arranged approximately in parallel to one another.

The heat sink for the semiconductor lasers LD1 and LD2 is secured onto the substrate 10 on which the quarter-split light receiving surface PD1 of the photodetector for detecting the intensity of light is formed under the holographic optical element 50.

The objective lens 4 can be constructed to absorb differences in the disk's thickness and numerical aperture in accordance with the specifications of a CD and DVD by, for example, selecting a combination of a condenser lens and a Fresnel lens or a holographic lens, switching two objective lens, which match for the respective specifications, from one to the other as needed, or providing a condenser lens for a DVD with some means for restricting the aperture at the time of playing back a CD. Alternatively, the condenser lens itself may be a two-focus objective lens designed for both a CD and DVD.

The pickup body is further provided with an objective lens drive mechanism 26 which includes a tracking actuator and a focus actuator. The focus actuator of this objective lens drive mechanism 26 moves the objective lens 4 in a direction perpendicular to the recording surface of the optical disk 5, and the tracking actuator moves the objective lens 4 in the radial direction of the optical disk 5. The objective lens drive mechanism 26 includes a slider mechanism for coarse movement in the radial direction.

The optical pickup apparatus, as apparent from the above, has a common optical system which guides the light beam from each semiconductor laser on the optical disk 5 via the objective lens 4 to form a light spot on the recording surface, converges the return light from the light spot via the objective lens 4 and guides the light to the quarter-split light receiving surface PD1.

The holographic optical element 50 is so designed and arranged as to direct the light beams, launched from the semiconductor lasers LD1 and LD2 along a substantially common light path.

The holographic optical element 50 has first and second holographic optical elements 51 and 52. The first holographic optical element 51, located on the substrate side, has a first diffraction relief, which passes the light beam of the wavelength $\lambda 1$ from the semiconductor laser LD1, performing nothing but diffraction thereon, eliminates coma aberration and spherical aberration of the light reflected at the information recording surface of the optical disk (i.e., return light), thereby generating a predetermined amount of astigmatism, and provides the element 51 with a lens performance to change the image forming distance. The second holographic optical element 52, located on the objective lens side, has a second diffraction relief, which passes the light beam of the wavelength $\lambda 2$ from the semiconductor laser LD2, performing nothing but diffraction thereon, eliminates coma aberration and spherical aberration of the light reflected at the information recording surface of the optical disk (i.e., return light), thereby generating a predetermined amount of astigmatism, and provides the element 52 with a lens performance to change the image forming distance. Each of the first and second holographic optical elements 51 and 52 has a shape of a plate with a transparent diffraction grating 151a or 152a (which may be a refractive index distribution type or relief type, and will be called "diffraction relief" hereinafter) defined on one major surface of a plate 151 or 152 which is made of a transparent isotropic material.

Recording and reproduction of this optical pickup apparatus will now be briefly explained. As shown in FIG. 1, in playing back a DVD, the laser beam from the semiconductor laser LD1 is condensed on the optical disk 5 with the numerical aperture NA of 0.6 according to the set distance between the objective lens 4 and the optical disk, thereby forming a small light spot. At the time of playing back a CD, or recording or playing back a CD-R, the laser beam from the semiconductor laser LD2 forms a light spot on the optical disk 5 with the numerical aperture NA of 0.47 through the objective lens 4, according to the set distance between the objective lens 4 and the optical disk.

Each return light from the light spot on the recording surface of the optical disk 5 enters the holographic optical element 50 via the objective lens 4 and is diffracted there, and an acquired first-order diffraction light component reaches the quarter-split light receiving surface PD1 of the photodetector.

Figure 2A:
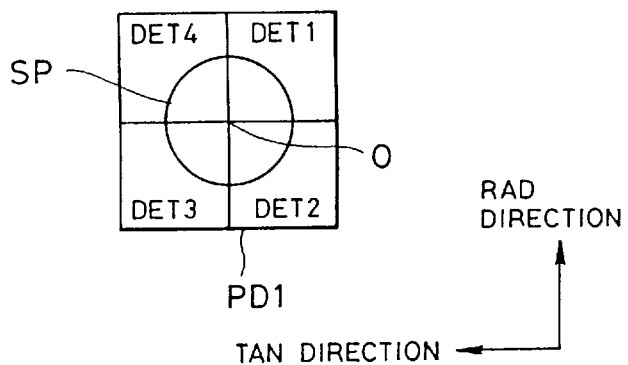
FIGS. 2A through 2C are plan views of a quarter-split light receiving surface of a photodetector in this embodiment.
Figure 2B:
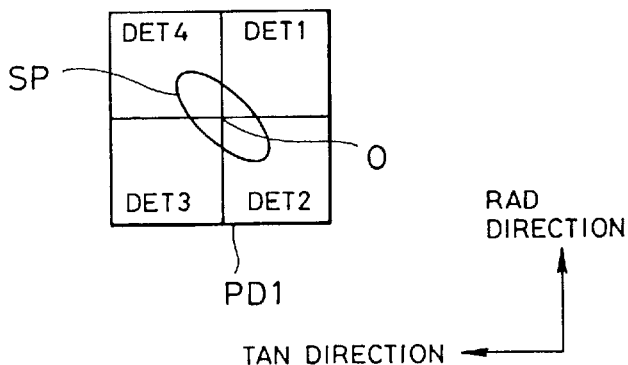
Figure 2C:
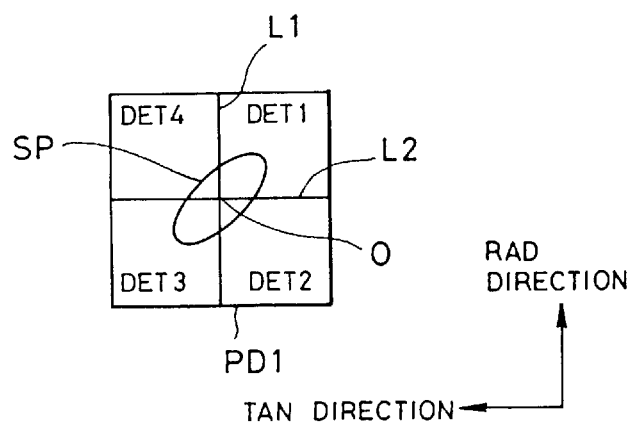

The quarter-split light receiving surface, as shown in FIGS. 2A through 2C, consists of four elements DET1 to DET4 of the first to fourth quadrants, which are arranged adjacent to one another with respect to two perpendicular segmenting lines L1 and L2 and are independent of one another. The quarter-split light receiving surface PD1 is arranged, together with the semiconductor lasers, on the substrate 10 in line so that one of the segmenting lines is parallel to the track direction (also called tangential (TAN) direction) of the recording surface and the other in parallel to the radial (also called RAD direction) of the optical disk. The segmenting lines coincide with the segmenting directions in the case where tracking servo is carried out according to a retardation method (time difference method).

With the light beam in focus on the recording surface, a light spot SP of a complete circle whose intensity distribution is symmetrical with respect to the center O of the quarter-split light receiving surface PD1 or symmetrical in the track direction and radial direction as shown in FIG. 2A is formed on the quarter-split light receiving surface PD1. Therefore, a value acquired by adding the photoelectrically converted outputs of the elements on one diagonal line becomes equal to a value obtained by adding the photoelectrically converted outputs of the elements on the other diagonal line, so that the focus error component becomes "0". With the light beam in out of focus, on the other hand, a light spot SP of an ellipse in a diagonal direction as shown in FIG. 2B or 2C is formed on the quarter-split light receiving surface PD1. Therefore, focus error components acquired by adding the photoelectrically converted outputs of the elements on each diagonal line are opposite in phase. In other words, with DET1 to DET4 denoting the corresponding outputs, (DET1+DET3)−(DET2+DET4) becomes a focus error signal. Further, (DET1+DET4)−(DET2+DET3) becomes a tracking error signal, and DET1+DET2+DET3+DET4 becomes an RF signal.

When a spot image is formed near the center of the quarter-split light receiving surface PD1, the photodetector supplies an electric signal according to the spot image formed on the individual four receiving surfaces to a demodulating circuit 32a and an error detecting circuit 32b. The demodulating circuit 32a produces a record signal based on that electric signal. The error detecting circuit 32b generates a focus error signal, a tracking error signal, other servo signals, etc. based on the electric signal, and supplies the individual drive signals to the respective actuators via an actuator driving circuit 33 to carry out servo control on the objective lens 4 and other associated components in accordance with those drive signals.

Design of Holographic Optical Element

The holographic optical element 50 is designed by a computer aided design based on, for example, a flowchart in FIG. 3 which will be discussed later, in such a way that the holographic optical element 50 comprises the first holographic optical element 51 designed by interference of the light from the semiconductor laser LD1 with the light which converges on the quarter-split light receiving surface PD1 and the second holographic optical element 52 designed by interference of the light from the semiconductor laser LD2 with aberration-free light which travels toward the objective lens 4. The wave surface for the grating pattern is acquired by ray-tracing using the high refractive index method and the phase function method. It is to be noted that the first holographic optical element 51 is designed not to take any action on the light of the wavelength $\lambda 2$ from the semiconductor laser LD2 whereas the second holographic optical element 52 is designed not to take any action on the light of the wavelength $\lambda 1$ from the semiconductor laser LD1.

Figure 4:
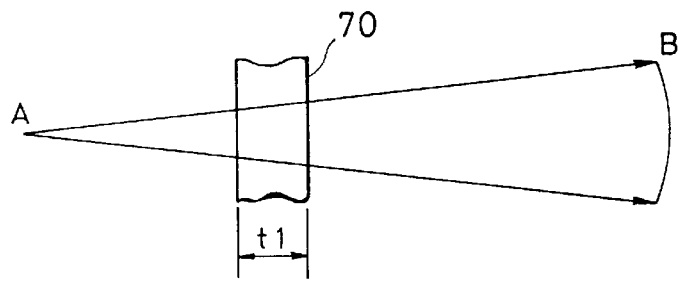
FIG. 4 is a schematic diagram showing the design of a wave surface of the holographic optical element of the optical pickup apparatus according to the first embodiment of this invention.

First, in step S1, let us consider a case where a plane-parallel plate 70 (refractive index n) having a thickness t1 is placed, with its optical axis set perpendicularly, in the light path of rays of light (wavelength $\lambda 1$), emitted from one point A corresponding to a semiconductor laser, as shown in FIG. 4. The coordinates of the point A and the initial values for the parameters $\lambda 1$, t1 and n are set.

For the diverging rays after passing the plane-parallel plate 70, its wave surface including spherical aberration at the coordinates of a position B is computed and the result is saved.

The spherical aberration of the diverging rays produced by the plane-parallel plate 70 is corrected and removed in the next step S2. The amount of produced astigmatism can be adjusted by changing the thickness t1 of the plane-parallel plate 70.

Figure 5:
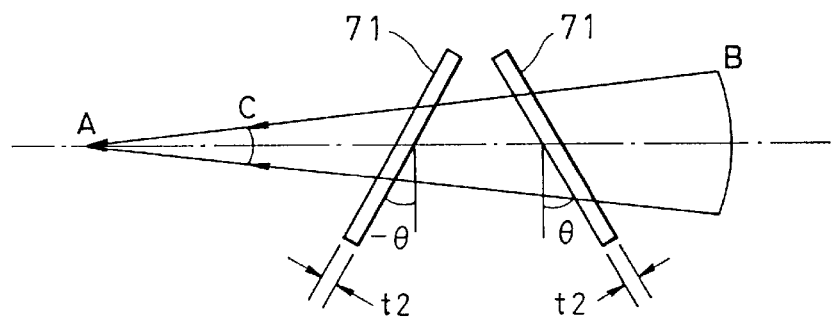
FIG. 5 is a schematic diagram depicting the design of a wave surface of the holographic optical element of the optical pickup apparatus according to the first embodiment of this invention.

In step S2, as the rays are returned in the converging or reverse direction from the saved wave surface at the position B, the rays converge on one point A after passing the plane-parallel plate of the thickness t1, as shown in FIG. 5.

With two plane-parallel plates 71 (refractive index n) of a thickness t2, instead of the plane-parallel plate 70, set apart from each other and inclined at angles of $\theta$ degrees and $-\theta$ degrees with respect to a plane perpendicular to the optical axis in such a way as to have a mirror image relation to that plane, the wave surface of rays of light at a position C after passing the plane-parallel plates is computed. For this purpose, the coordinates of the position C and the parameters t2, $\theta$ and $-\theta$ are introduced.

In this case, as the rays are returned in the reverse direction from the position B, the wave surface that passes those plane-parallel plates 71 arranged in a pattern like the inverted "V" do not include coma aberration though they have astigmatism and spherical aberration. The spherical aberration can be adjusted by changing the thickness t2 of the plane-parallel plates 71. It is thus possible to cancel out the spherical aberration that has been produced in step S1. This way, it is possible to calculate a wave surface of the rays of light with a predetermined amount of astigmatism but without any coma aberration or spherical aberration at a position C after passing the two plane-parallel plates 71 arranged in a pattern like the inverted "V". The obtained wave surface at the position C will be saved.

Figure 6:
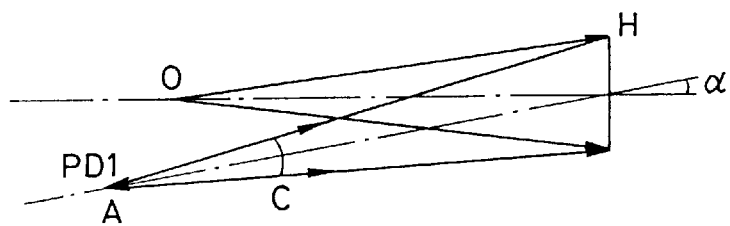
FIG. 6 is a schematic diagram showing the design of a wave surface of a first holographic optical element of the optical pickup apparatus according to the first embodiment of this invention.

In the subsequent step S3, a wave surface at a certain inclined (angle $\alpha$) position H of rays of light that are returned again in the reverse direction from the saved wave surface at the position C to diverge, as shown in FIG. 6, is computed. Here, a point on which rays of light converge from the saved wave surface at the position C corresponds to the position of the quarter-split light receiving surface PD1.

The grating pattern of the first holographic optical element in this embodiment can be designed by causing the saved wave surface to interfere with the wave surface of rays of light (wavelength λ1) which diverge from a given point O (semiconductor laser LD1), at this position H (first holographic optical element). For this purpose, the coordinates of H and O and the parameter a are introduced. Interference fringes at that position H, which result from the interference, are saved as the grating pattern of the first holographic optical element.

Forming this grating pattern on the transparent substrate can provide the first holographic optical element 51 shown in FIG. 1, which eliminates coma aberration and spherical aberration, produces a predetermined amount of astigmatism and has its image forming distance varied by the lens performance given to the element 51.

Figure 3:
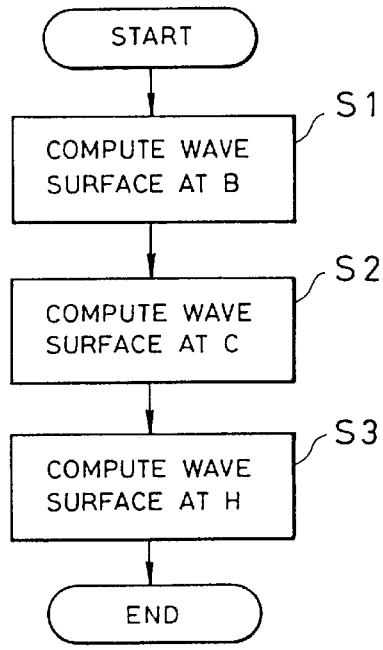
FIG. 3 is a flowchart illustrating how to design a wave surface of a holographic optical element of the optical pickup apparatus according to the first embodiment of this invention.
Figure 7:
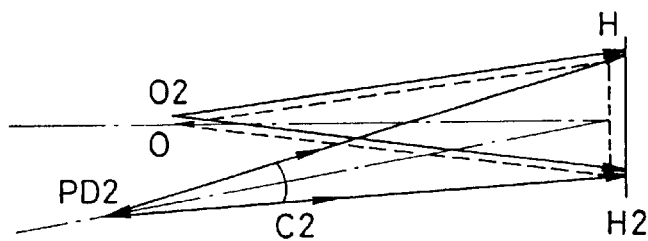
FIG. 7 is a schematic diagram showing the design of a wave surface of a second holographic optical element of the optical pickup apparatus according to the first embodiment of this invention.

The second holographic optical element 52 is also designed with the design scheme illustrated in the flowchart in FIG. 3. In this case, as shown in FIG. 7, the wave surface of the rays of light from the point O is made to interfere with the wave surface of the rays of light (wavelength λ2) from a point O2 (semiconductor laser LD2). For this purpose, the coordinate positions of H2 and O2 are introduced. The point on which the rays of light from the saved wave surface at the position C2 converge corresponds to the position of the quarter-split light receiving surface PD2. A wave surface at the position H2 is computed by causing the rays of light to travel in the reverse direction again from the saved wave surface at the position C2 to diverge. The grating pattern of the second holographic optical element in this embodiment can be designed by causing this wave surface to interfere with the wave surface of rays of light (wavelength λ2) which diverge from a given point O2 (semiconductor laser LD2), at this position H2 (second holographic optical element). Interference fringes at that position H2, which result from the interference, are set as the grating pattern of the second holographic optical element. Forming this grating pattern on the transparent substrate can provide the second holographic optical element 52, which eliminates coma aberration and spherical aberration, produces a predetermined amount of astigmatism and has its image forming distance varied by the lens performance given to the element 52.

The above procedures can provide the optical system, which has the first holographic optical element 51 designed by making the light from the semiconductor laser LD1 to interfere with the light that converges on the quarter-split light receiving surface PD1, and the second holographic optical element 52 designed by making the light from the semiconductor laser LD2 to interfere with aberration-free light that travels toward the objective lens 4, as shown in FIG. 1.

Figure 8:
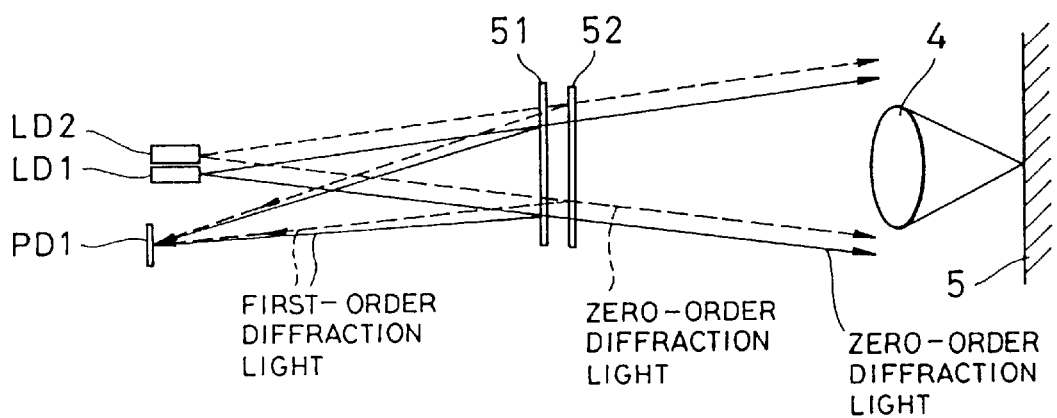
FIG. 8 is a schematic diagram showing the design of an optical system of the optical pickup apparatus according to the first embodiment of this invention.

In the first embodiment, as shown in FIG. 8, the semiconductor laser LD1, the quarter-split light receiving surface PD1 and the first holographic optical element 51 act in such a way as to pass the light beam of the wavelength λ1 from the semiconductor laser LD1, guide its zero-order diffraction light to the objective lens 4, receive from the objective lens 4 the return light from a light spot on the recording surface, which is formed by the zero-order diffraction light of the wavelength λ1, and guide the diffracted first-order diffraction light of the wavelength λ1 to the quarter-split light receiving surface PD1. The semiconductor laser LD2, the quarter-split light receiving surface PD1 and the second holographic optical element 52 likewise act in such a way as to pass the light beam of the wavelength λ2 from the semiconductor laser LD2, guide its zero-order diffraction light to the objective lens 4, receive from the objective lens 4 the return light from a light spot on the recording surface, which is formed by the zero-order diffraction light of the wavelength λ2, and guide the diffracted first-order diffraction light of the wavelength λ2 to the quarter-split light receiving surface PD1.

Second Embodiment

Figure 9:
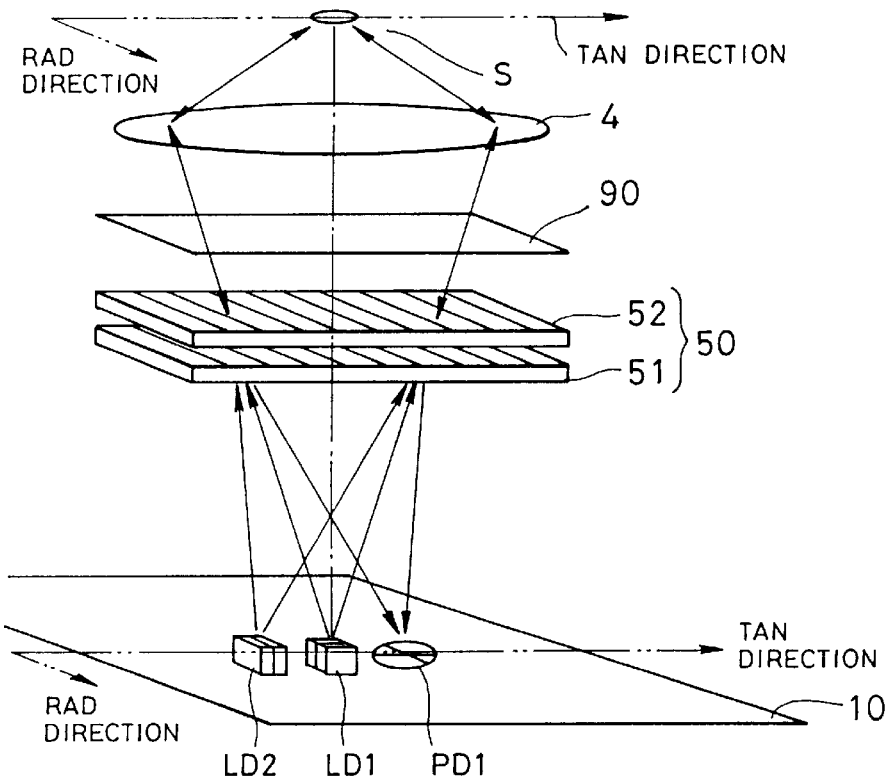
FIG. 9 is a schematic perspective view of the interior of an optical pickup apparatus according to a second embodiment of this invention.

As shown in FIG. 9, a second-embodiment is an optical pickup apparatus which is similar to that of the first embodiment, except for an aberration correcting element 90 provided between the second holographic optical element 52 and the objective lens 4. Specifically, the semiconductor laser LD1, the quarter-split light receiving surface PD1 and the first holographic optical element 51 are arranged in such a way as to pass the light beam of the wavelength λ1 from the semiconductor laser LD1, guides its zero-order diffraction light to the objective lens 4, receives from the objective lens 4 the return light from a light spot on the recording surface, which is formed by the zero-order diffraction light of the wavelength λ1, and guides the diffracted, first-order diffraction light of the wavelength λ1 to the quarter-split light receiving surface PD1.

Figure 10:
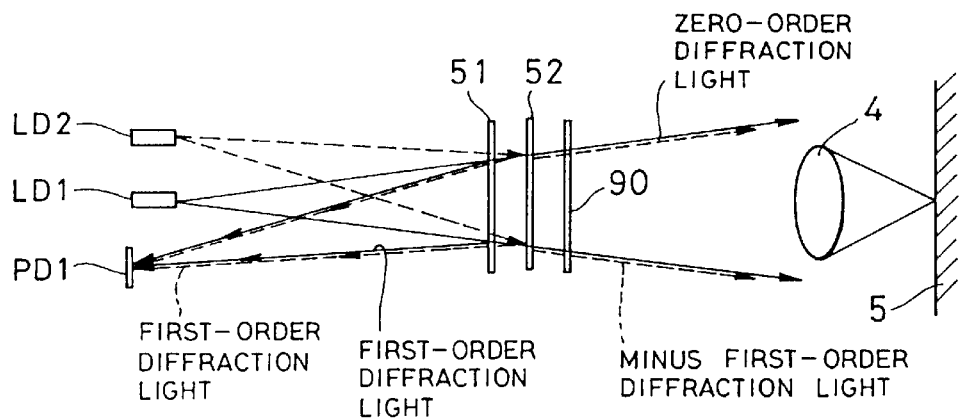
FIG. 10 is a schematic diagram showing the design of an optical system of the optical pickup apparatus according to the second embodiment of this invention.

In the second embodiment, the aberration correcting element 90 is designed as follows. First, let us assume a case where the aberration correcting element 90 is not present in the forward path in FIG. 10. The semiconductor laser LD2 and the quarter-split light receiving surface PD1 are arranged on the substrate in such a manner that the second holographic optical element 52 passes the light beam of the wavelength λ2, launched from the semiconductor laser LD2, guides its negative first-order diffraction light to the objective lens 4, forming a light spot on the recording surface 5, diffracts the return light traveled from that light spot through the objective lens 4, yielding first-order diffraction light of the wavelength λ2, and guides the first-order diffraction light of the wavelength λ2 to the quarter-split light receiving surface PD1.

In this case, the negative first-order diffraction light of the light beam of the wavelength λ2, which result from diffraction by the second holographic optical element 52 and travels toward the objective lens 4, will become aberrated rays of light in the forward path between the second holographic optical element 52 and the objective lens 4.

To correct this aberration, the aberration correcting element 90 is arranged between the second holographic optical element 52 and the objective lens 4. This aberration correcting element 90 demonstrates no actions at all when the light beam from the semiconductor laser LD1 passes there, and converts the light from the semiconductor laser LD2 which has passed the second holographic optical element 52 to aberration-free light. That is, the aberration correcting element 90 passes the light beam of the wavelength λ2, launched from the semiconductor laser LD2, eliminates aberration from the light beam and guides the resultant light beam to the objective lens 4, while taking no action on the light beam of the wavelength λ1. The wave surface of the diverging rays of light in the negative first diffraction, and then the wave surface on the aberration correcting element 90 are acquired based on the position of the semiconductor laser LD2 by ray-tracing using the high refractive index method and the phase function method to thereby compute the amount of aberration correction of the aberration correcting element 90. The aberration correcting element 90 is so designed as to convert only the wave surface of the negative first-order diffraction light, which travels toward the optical disk from the second holographic optical element 52, to be free of aberration.

Figure 27:
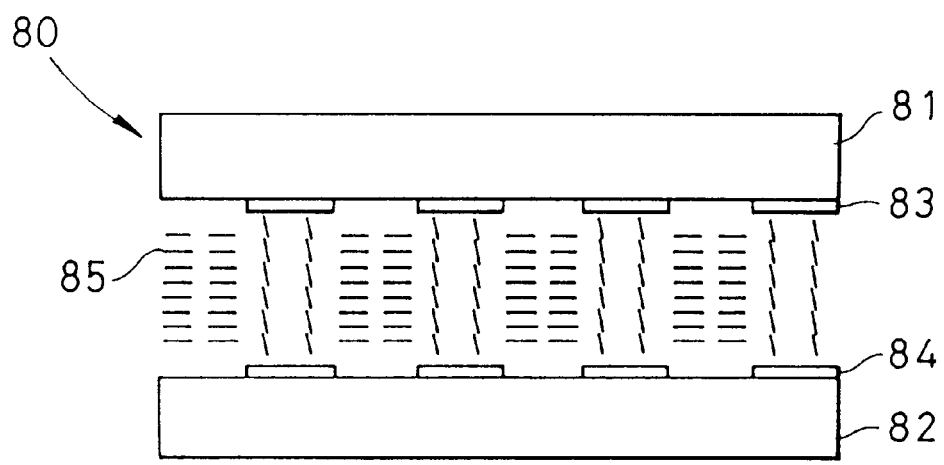
FIG. 27 is a schematic partly cross-sectional view of a liquid crystal device for use in the optical pickup apparatus embodying this invention.
Figure 28:
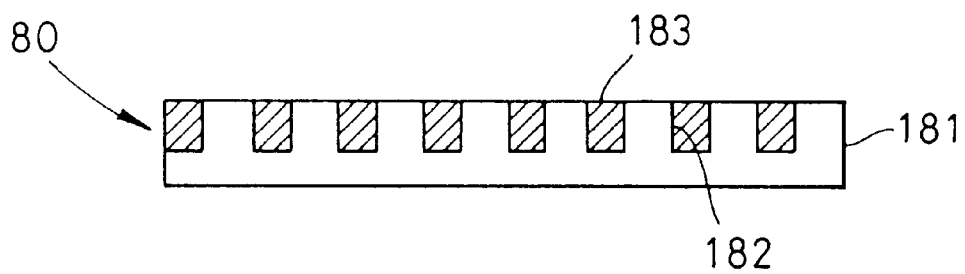
FIG. 28 is a schematic partly cross-sectional view of an aberration correcting element of a non-linear optical material type for use in the optical pickup apparatus embodying this invention.

This aberration correcting element 90 can be realized by electrically switching a liquid crystal device 80 as shown in FIG. 27 or by an aberration correcting element 80 of a non-linear optical material type as shown in FIG. 28.

The liquid crystal device 80 in FIG. 27 for use as an aberration correcting element has transparent electrodes 83 and 84 a pattern corresponding to an aberration correcting wave surface on the respective inner surfaces of a pair of transparent glass substrates 81 and 82, and a liquid crystal layer 85 provided between the transparent electrodes 83 and 84. When a voltage is applied to the liquid crystal layer 85 via the transparent electrodes 83 and 84, liquid crystal molecules are inclined from the state where no voltage is applied. Using this phenomenon, the aberration correcting element 80 can selectively be rendered to act, or not to act, on the rays of light of the wavelengths $\lambda 1$ and $\lambda 2$ from the semiconductor lasers LD1 and LD2. When the polarization direction of the incident light is perpendicular to the alignment of the liquid crystal molecules, for example, no diffraction occurs and the element 80 does not operate as a liquid crystal type aberration correcting element. When the polarization direction of the incident light is parallel to the alignment of the liquid crystal molecules, on the other hand, diffraction occurs and the aberration correcting element 80 acts as a liquid crystal type aberration correcting element. That is, selective application of a voltage or no voltage sets the inclined and uninclined portions of the liquid crystal molecules into a pattern corresponding to the aberration correcting wave surface, resulting in a variation in the refractive index of the liquid crystal layer and a variation in the length of the light path of rays of light, so that the element 80 works as an aberration correcting element. The reverse setting is also possible. Furthermore, because the inclination of the liquid crystal molecules can be controlled in accordance with the voltage applied to the liquid crystal layer, the amount of aberration correction of the aberration correcting element can be controlled arbitrarily.

If, as shown in FIG. 28, a wavelength-selectable non-linear optical material like lithium niobate is used for a transparent substrate 181, and the pattern corresponding to the aberration correcting wave surface is etched to form recesses 182, which are then filled with an isotropic optical material 183 whose refractive index is equal to the refractive index of extraordinary ray or the refractive index of ordinary ray of the non-linear optical material, it is possible to select the enabled state or the disabled state of the non-linear optical material type aberration correcting element 80 depending on the difference in wavelength, $\lambda 1$ or $\lambda 2$, between the semiconductor lasers LD1 and LD2.

Third Embodiment

Figure 11:
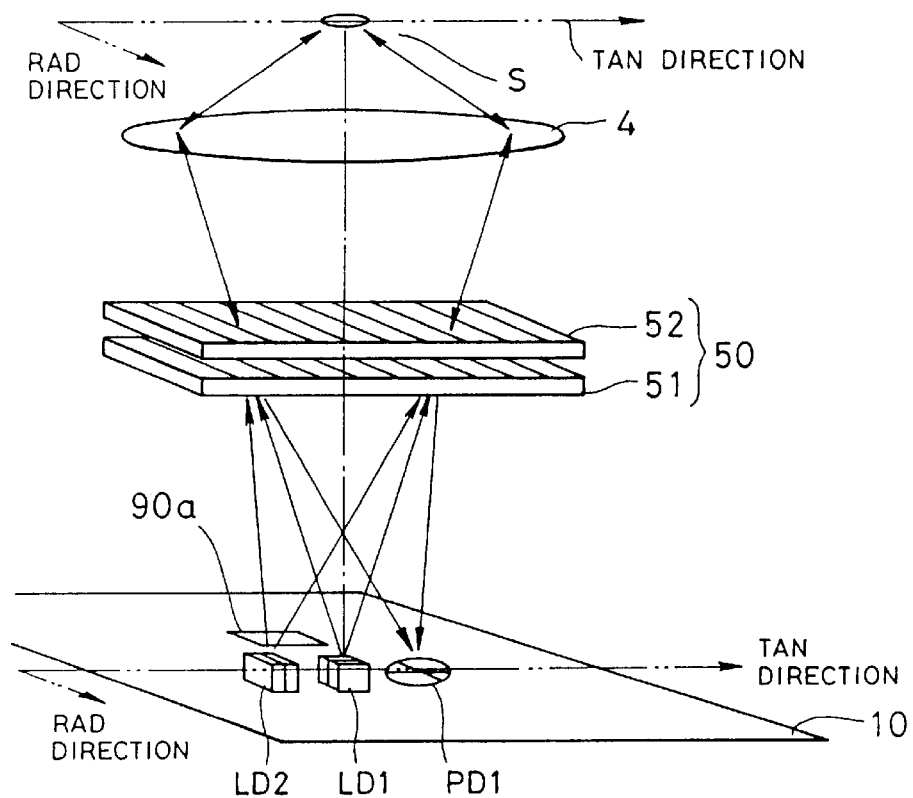
FIG. 11 is a schematic perspective view of the interior of an optical pickup apparatus according to a third embodiment of this invention.

A third embodiment is the same as the second embodiment except that a light-source side aberration correcting element 90a is arranged between the semiconductor laser LD2 and the first holographic optical element 51 as shown in FIG. 11 in place of the aberration correcting element 90 located between the second holographic optical element 52 and the objective lens 4 of the second embodiment.

In this case, the second holographic optical element 52 is designed based on the wave surface that results from the interference between an aberration-free wave surface from the disk's recording surface with a wave surface from the quarter-split light receiving surface PD1. The light-source side aberration correcting element 90a is so designed as to convert the wave surface of the negative first-order diffraction light, which has been diffracted by the second holographic optical element 52 and then travels toward the disk's recording surface, to be free of aberration.

Figure 12:
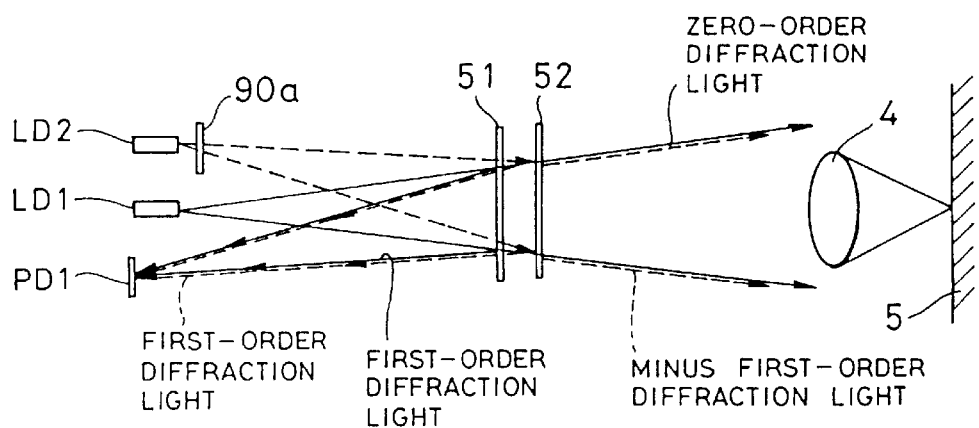
FIG. 12 is a schematic diagram showing the design of an optical system of the optical pickup apparatus according to the third embodiment of this invention.

As shown in FIG. 12, in the forward path, the light-source side aberration correcting element 90a, located between the semiconductor laser LD2 and the first holographic optical element 51, passes the light beam of the wavelength $\lambda 2$, launched from the semiconductor laser LD2, and gives this light beam such aberration as to cancel aberration, which occurs at the time the light beam passes the holographic optical element 51, to thereby eliminate aberration from the light beam of the wavelength $\lambda 2$ which has passed the holographic optical element 51.

Fourth Embodiment

Figure 13:
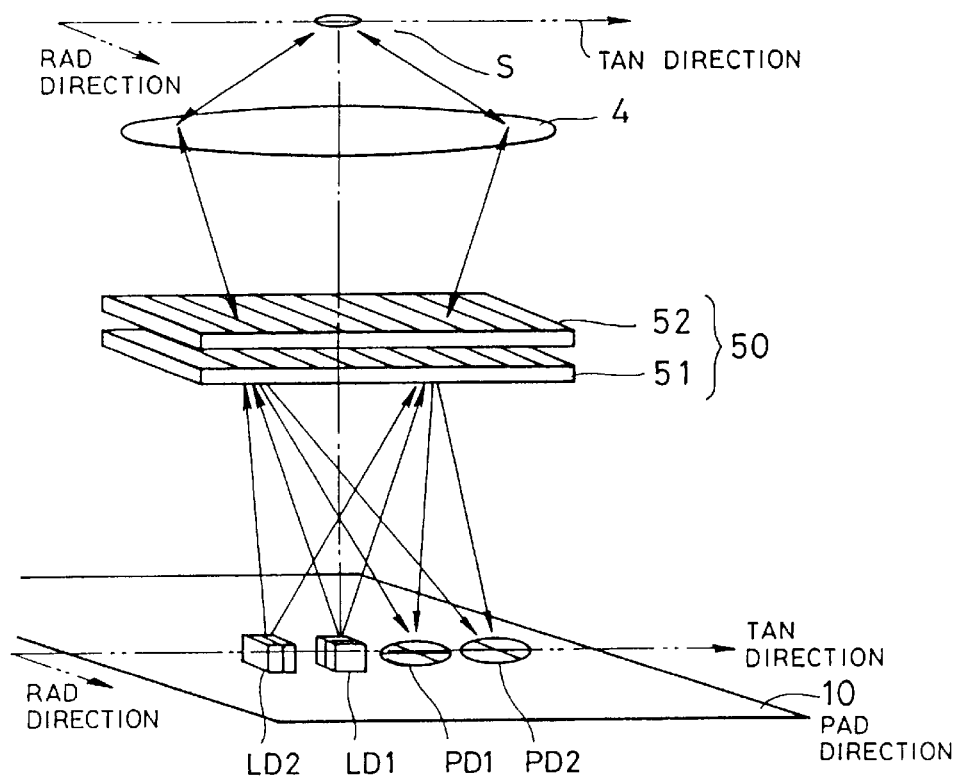
FIG. 13 is a schematic perspective view depicting the interior of an optical pickup apparatus according to a fourth embodiment of this invention.
Figure 14:
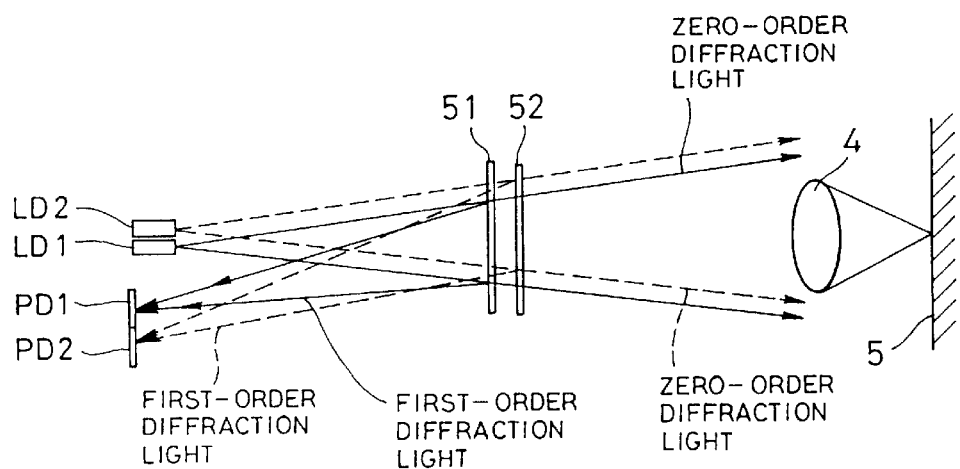
FIG. 14 is a schematic diagram showing the design of an optical system of the optical pickup apparatus according to the fourth embodiment of this invention.

As apparent from FIG. 13, a fourth embodiment is the same as the first embodiment, except for the additional provision of a second quarter-split light receiving surface PD2. As shown in FIG. 14, the semiconductor laser LD1, the quarter-split light receiving surface PD1 and the first holographic optical element 51 are arranged in such a way as to pass the light beam of the wavelength $\lambda 1$, launched from the semiconductor laser LD1, guides its zero-order diffraction light to the objective lens 4, receives from the objective lens 4 the return light from a light spot on the recording surface, which is formed by the zero-order diffraction light of the wavelength $\lambda 1$, diffracts the return light, and guides the resulting first-order diffraction light of the wavelength $\lambda 1$ to the quarter-split light receiving surface PD1.

The semiconductor laser LD2, the quarter-split light receiving surface PD2 and the second holographic optical element 52 are arranged in such a manner as to pass the light beam of the wavelength $\lambda 2$, launched from the semiconductor laser LD2, guides its zero-order diffraction light to the objective lens 4, receives from the objective lens 4 the return light from a light spot on the recording surface, which is formed by the zero-order diffraction light of the wavelength $\lambda 2$, diffracts the return light, and guides the resulting first-order diffraction light of the wavelength $\lambda 2$ to the quarter-split light receiving surface PD2. That is, the second holographic optical element 52 is designed based on the position of the additional quarter-split light receiving surface PD2, by the design scheme illustrated in the flowchart in FIG. 3.

Fifth Embodiment

Figure 15:
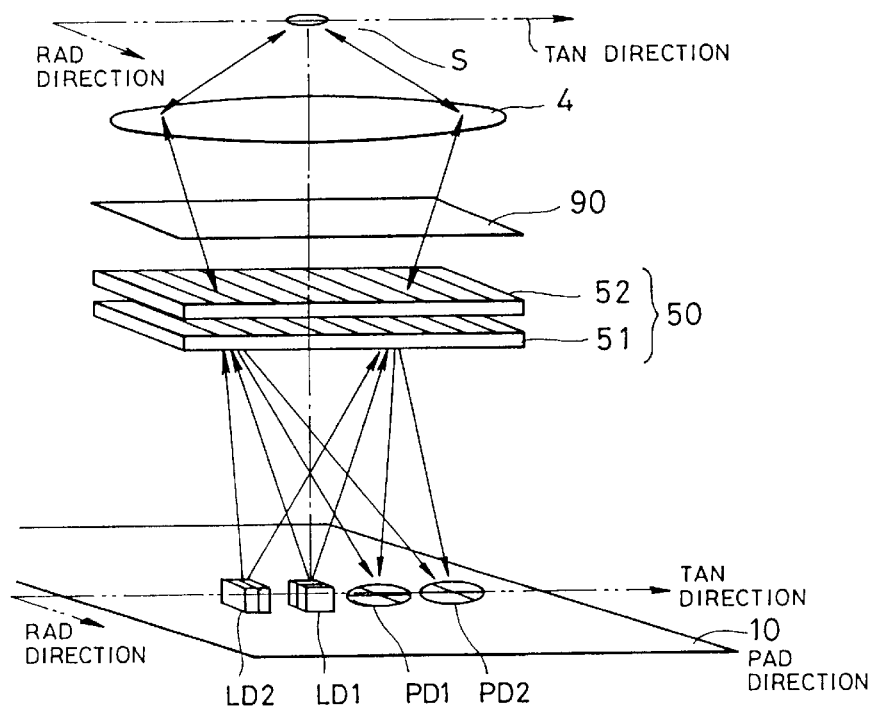
FIG. 15 is a schematic perspective view of the interior of an optical pickup apparatus according to a fifth embodiment of this invention.

As shown in FIG. 15, a fifth embodiment is the same as the fourth embodiment, except that the aberration correcting element 90 is located between the second holographic optical element 52 and the objective lens 4. The semiconductor laser LD1, the quarter-split light receiving surface PD1 and the first holographic optical element 51 are arranged in such a way as to pass the light beam of the wavelength $\lambda 1$ from the semiconductor laser LD1, guides its zero-order diffraction light to the objective lens 4, receives from the objective lens 4 the return light from a light spot on the recording surface, which is formed by the zero-order diffraction light of the wavelength $\lambda 1$, and guides the diffracted, first-order diffraction light of the wavelength $\lambda 1$ to the quarter-split light receiving surface PD1.

Figure 16:
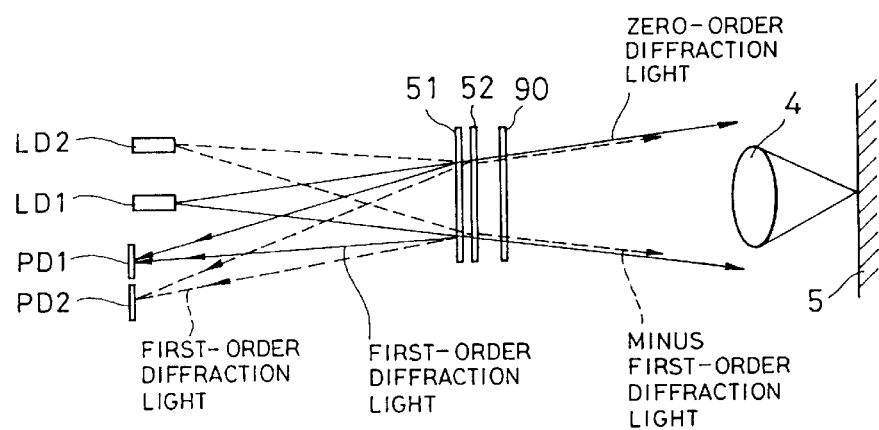
FIG. 16 is a schematic diagram showing the design of an optical system of the optical pickup apparatus according to the fifth embodiment of this invention.

In the fifth embodiment, the aberration correcting element 90 is designed in a manner similar to that of the second embodiment. That is, assume that the aberration correcting element 90 is not present in the forward path in FIG. 16. The quarter-split light receiving surface PD2 and the semiconductor laser LD2 are arranged on the substrate in such a manner that the second holographic optical element 52 passes the light beam of the wavelength $\lambda 2$, launched from the semiconductor laser LD2, guides its negative first-order diffraction light to the objective lens 4, forming a light spot on the recording surface 5, and guides the first-order diffraction light of the wavelength λ2, which has been acquired by diffracting the return light traveled from the light spot through the objective lens 4, by means of the second holographic optical element 52, to the quarter-split light receiving surface PD2.

In this case, the negative first-order diffraction light of the light beam of the wavelength λ2, which result from diffraction by the second holographic optical element 52 and travels toward the objective lens 4, will become aberrated rays of light in the forward path between the second holographic optical element 52 and the objective lens 4.

To correct this aberration, the aberration correcting element 90 is arranged between the second holographic optical element 52 and the objective lens 4. This aberration correcting element 90 demonstrates no actions at all when the light beam from the semiconductor laser LD1 passes there, and converts the light from the semiconductor laser LD2 which has passed the second holographic optical element 52 to aberration-free light. That is, the aberration correcting element 90 passes the light beam of the wavelength λ2, launched from the semiconductor laser LD2, eliminates aberration from the light beam and guides the resultant light beam to the objective lens 4, while taking no action on the light beam of the wavelength λ1. The aberration correcting element 90 is so designed as to convert only the wave surface of the negative first-order diffraction light, which travels toward the optical disk from the second holographic optical element 52, to aberration-free light.

Sixth Embodiment

Figure 17:
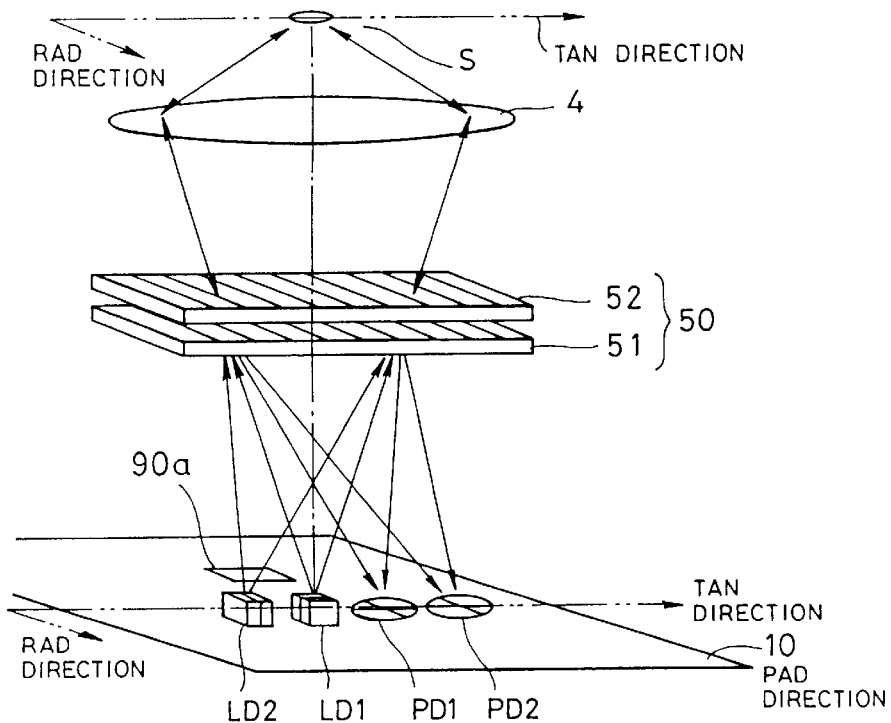
FIG. 17 is a schematic perspective view of the interior of an optical pickup apparatus according to a sixth embodiment of this invention.

A sixth embodiment is the same as the fourth embodiment except that a light-source side aberration correcting element 90a is placed between the semiconductor laser LD2 and the first holographic optical element 51 as shown in FIG. 17 in place of the aberration correcting element 90 located between the second holographic optical element 52 and the objective lens 4 of the fourth embodiment.

In this case, the second holographic optical element 52 is also designed based on the wave surface that results from the interference between an aberration-free wave surface from the disk's recording surface with a wave surface from the quarter-split light receiving surface PD1. The light-source side aberration correcting element 90a is so designed as to convert the wave surface of the negative first-order diffraction light, which has been diffracted by the second holographic optical element 52 and then travels toward the disk's recording surface, to be free of aberration.

Figure 18:
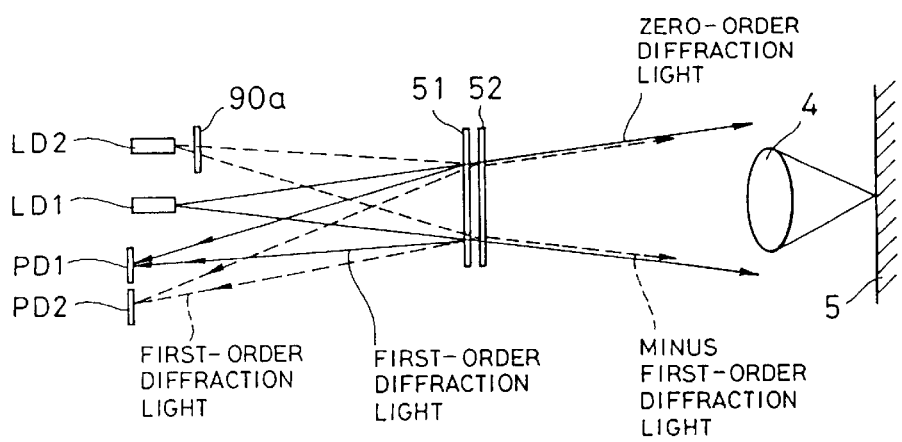
FIG. 18 is a schematic diagram showing the design of an optical system of the optical pickup apparatus according to the sixth embodiment of this invention.

As shown in FIG. 18, in the forward path, the light-source side aberration correcting element 90a, located between the semiconductor laser LD2 and the first holographic optical element 51, passes the light beam of the wavelength λ2, launched from the semiconductor laser LD2, and gives this light beam such aberration as to cancel aberration, which occurs at the time the light beam passes the holographic optical element 51, to thereby eliminate aberration from the light beam of the wavelength λ2 which has passed the holographic optical element 51.

The aberration correcting element 90 and the light-source side aberration correcting element 90a in the optical pickup apparatuses of the third, fifth and sixth embodiments can be realized by electrically switching the liquid crystal device 80 as shown in FIG. 27 or by the aberration correcting element 80 of a non-linear optical material type as shown in FIG. 28 as in the second embodiment.

Although the foregoing description of the first to sixth embodiments has been given on the premise that the objective lens is of a finite type, it should be apparent to those skilled in the art that such an objective lens may be replaced with an infinite objective lens system, implemented by arranging a condenser lens on an optical recording medium side and arranging a collimator lens on the semiconductor laser side, without sacrificing the advantages.

Holographic Optical Elements

A description will now be given of the first holographic optical element 51 which does not act on light of the wavelength λ2 from the semiconductor laser LD2 and the second holographic optical element 52 which does not act on light of the wavelength λ1 from the semiconductor laser LD1.

Figure 19:
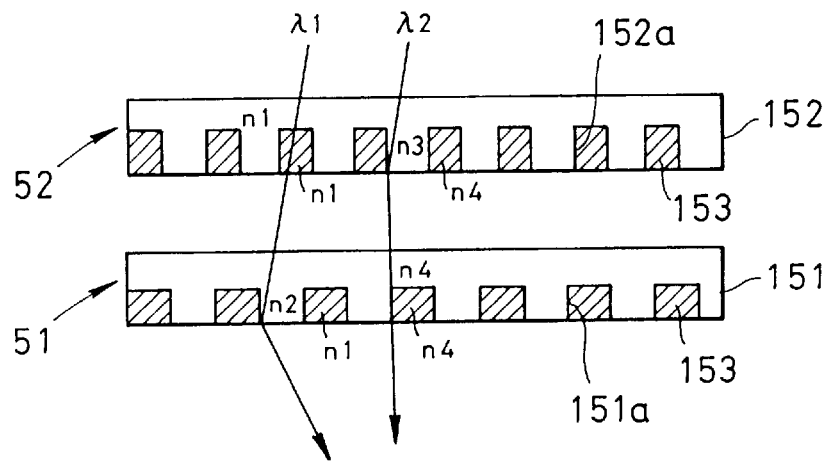
FIG. 19 is a schematic cross-sectional view illustrating the operations of the first and second holographic optical elements of the optical pickup apparatuses according to the above embodiments of this invention.

As shown in FIG. 19, the first (or second) holographic optical element 51 (or 52) comprises a substrate 151 (152), formed with recesses of the diffraction relief 151a (152a), which has been designed and formed on one major surface of a plate of an isotropic material like optical glass by the above-described method, and a filling section 153 formed by filling the recesses with, for example, an optical material whose refractive index varies with different wavelengths, and both major surfaces of the plate of each holographic optical element 51 (52) is designed to be parallel to each other. That is, the first and second diffraction reliefs 151a and 152a are formed on plane-parallel plates of separate transparent materials and optical materials like an isotropic material is filled in the diffraction reliefs 151a and 152a. This can significantly simplify the structure of a compatible player for DVD and DVD-RAM, thus ensuring size reduction and cost reduction of the pickup. The optical materials can be any type whose refractive index varies with different wavelengths, and may be an isotropic material like optical glass, an anisotropic material or a non-linear optical material of uniaxial crystal like lithium niobate.

Figure 20:
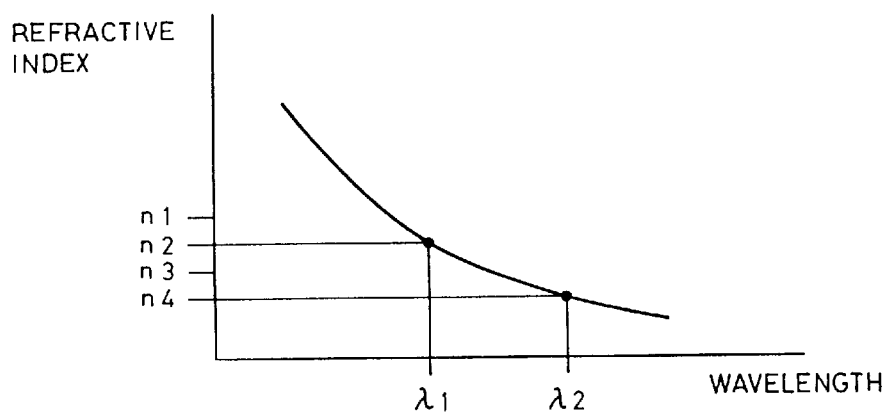
FIG. 20 is a graph showing dispersion of a material for the first holographic optical element of the optical pickup apparatuses according to the above embodiments of this invention.
Figure 21:
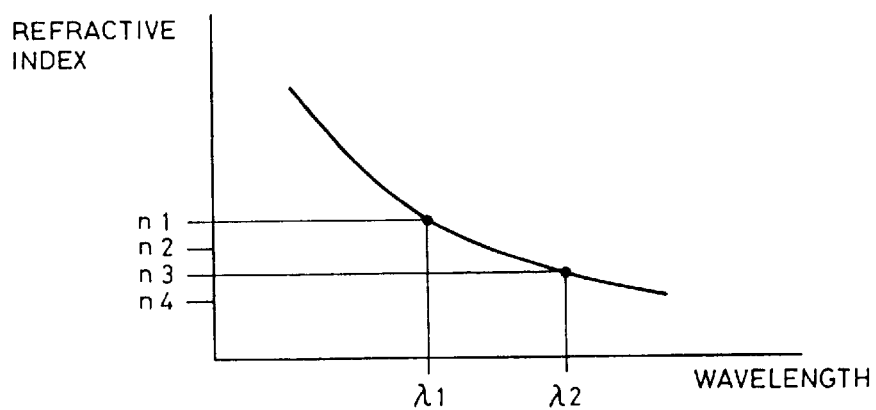
FIG. 21 is a graph showing dispersion of a material for the second holographic optical element of the optical pickup apparatuses according to the above embodiments of this invention.
Figure 22:
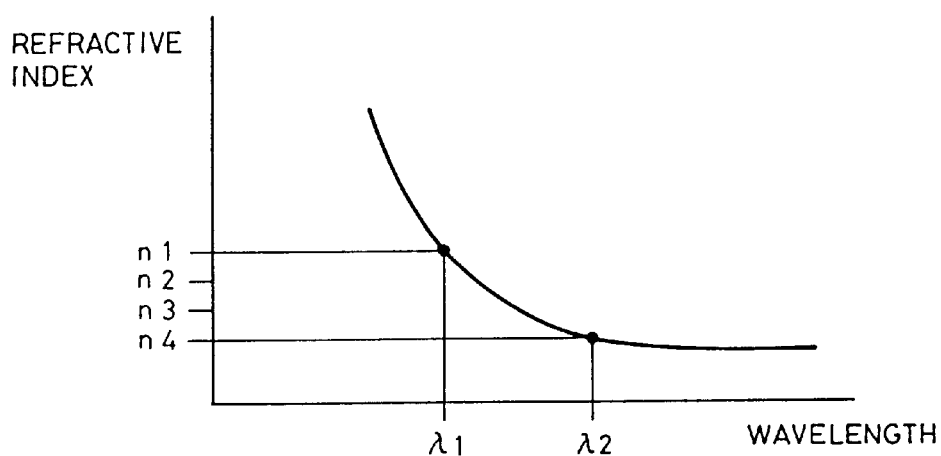
FIG. 22 is a graph showing dispersion of materials for the first and second holographic optical elements of the optical pickup apparatuses according to the above embodiments of this invention.

The first and second holographic optical elements 51 and 52 are implemented by utilizing plates and filling materials of such a property that the dispersion varies with different wavelengths. As shown in FIG. 20, the isotropic material for the substrate 151 of the first holographic optical element 51 shows the lowest refractive index n4 with respect to light of a long wavelength λ2 and shows a refractive index n2 with respect to light of a short wavelength λ1. As shown in FIG. 21, the isotropic material for the substrate 152 of the second holographic optical element 52 shows a refractive index n3 lower than n'with respect to light of the long wavelength λ2 and shows the highest refractive index n1 with respect to light of the short wavelength λ1. Further, the optical material for the filling section 153, as shown in FIG. 22, shows the lowest refractive index n4 with respect to light of the long wavelength λ2 and shows the highest refractive index n1 with respect to light of the short wavelength λ1.

As the light paths in the forward path are specifically designed by the above-described scheme, a light beam in the forward path does not face any problem. In the return path, however, a light beam travels along different light paths according to different wavelengths, as shown in FIG. 19.

Because, in the return path, the refractive index n1 of the filling material becomes equal to that (n1) of the optical glass at the time light of the wavelength λ1 passes through the second holographic optical element 52, the second holographic optical element 52 serves as a simple transparent plane-parallel plate so that the light of the wavelength λ1 directly passes the element 52. At the time light of the wavelength λ1 passes the first holographic optical element 51, the refractive index of the filling material becomes n1, different from the refractive index n2 of the optical glass, the first holographic optical element 51 serves as a diffraction grating. The first holographic optical element 51 therefore performs its inherent function on light of the wavelength λ1.

With regard to light of the wavelength λ2, on the other hand, the refractive Index of the filling material in the second holographic optical element 52 in the return path becomes n4, different from the refractive index n3 of the optical glass, so that the second holographic optical element 52 serves as a diffraction grating. As regards the first holographic optical element 51, however, since the refractive index n4 of the filling material for light of the wavelength λ2 becomes equal to that (n4) of the optical glass, the first holographic optical element 51 serves as a simple transparent plane-parallel plate so that the light of the wavelength λ2 directly passes the element 51. The second holographic optical element 52 therefore performs its inherent function on the light of the wavelength λ2.

Figure 23:
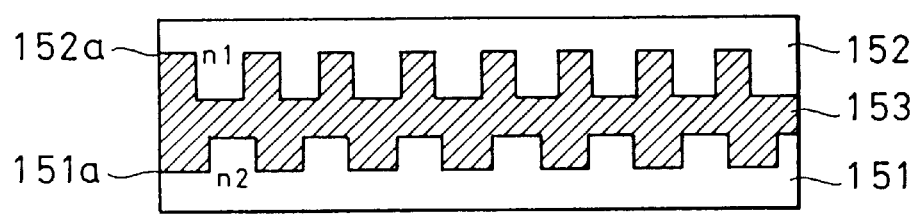
FIG. 23 is a schematic cross-sectional view of an integrated holographic optical element according to a modification of the optical pickup apparatus embodying this invention.
Figure 24:
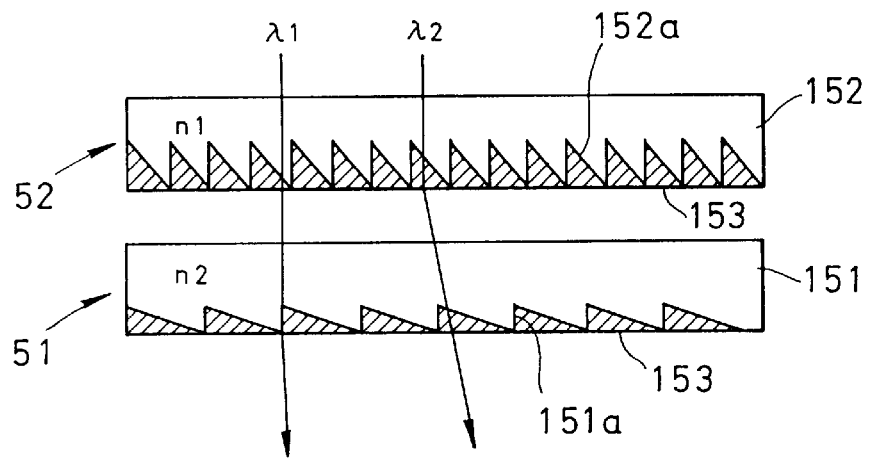
FIG. 24 is a schematic cross-sectional view of first and second holographic optical elements according to another modification of the optical pickup apparatus embodying this invention.

Although the first and second holographic optical elements 51 and 52 are used as separate elements in the above example, they may be designed as an integrated element as shown in FIG. 23 in which the first and second diffraction reliefs 151a and 152a are formed on the inner surfaces of a pair of plane-parallel plates 151 and 152 of separate transparent materials, set apart in parallel, with an optical material 153, e.g., a uniaxial crystal material, filled in the space between the inner surfaces. Further, the diffraction reliefs 151a and 152a may be formed into recesses of sawtooth cross-sectional shapes as shown in FIG. 24 besides recesses of rectangular cross-sectional shapes.

In the above examples, properly designing the pitches of the diffraction reliefs and the depths of their recesses can provide the holographic optical elements, which match the individual wavelengths.

Other Embodiments

Although the above-described embodiments use two holographic optical elements with an optical material used as the filling material for each diffraction relief, the holographic optical elements can be implemented by electrically switching a liquid crystal device of a plane-parallel plate capable of displaying a predetermined pattern like the liquid crystal device 80 as shown in FIG. 27, which is used as the aberration correcting element 90 or the light-source side aberration correcting element 90a in the optical pickup apparatuses of the second, third, fifth and sixth embodiments.

Figure 25A:
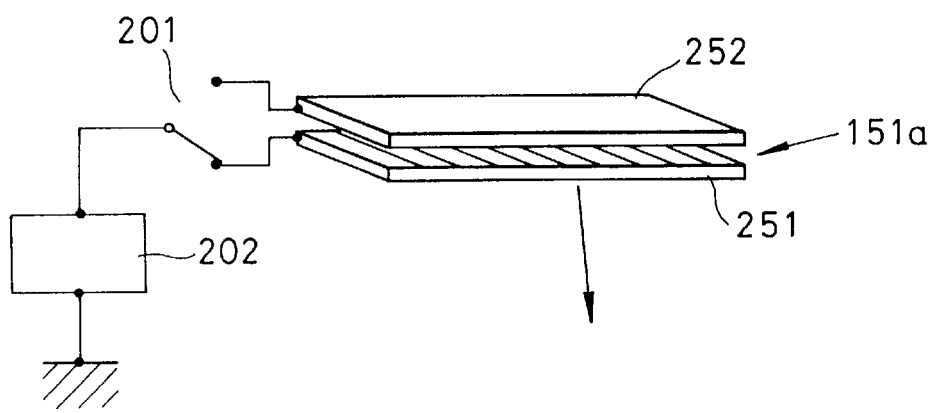
FIGS. 25A and 25B are schematic perspective views of a liquid crystal type holographic optical element according to a further modification of the optical pickup apparatus embodying this invention.
Figure 25B:
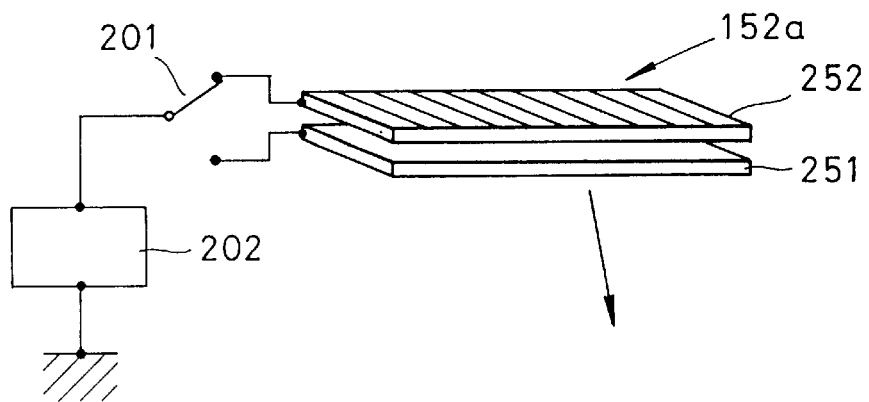

In this case, as shown in FIGS. 25A and 25B, the first and second diffraction reliefs are included in first and second liquid crystal 251 and 252 as predetermined patterns 151a and 152a, respectively. The first and second liquid crystal 251 and 252 are both connected via a switch 201 to an electric circuit 202 which is capable of selectively applying an electric field between the transparent electrodes of the first and second liquid crystal 251 and 252. As the switch 201 is switched to the first diffraction relief pattern 151a as shown in FIG. 25A in accordance with the selection of the semiconductor laser LD1 as the light source, the return light is allowed to converge on the quarter-split light receiving surface PD1, or as the switch 201 is switched to the second diffraction relief pattern 152a as shown in FIG. 25B in accordance with the selection of the semiconductor laser LD2 as the light source, the return light is permitted to converge on the quarter-split light receiving surface PD2.

Figure 26A:
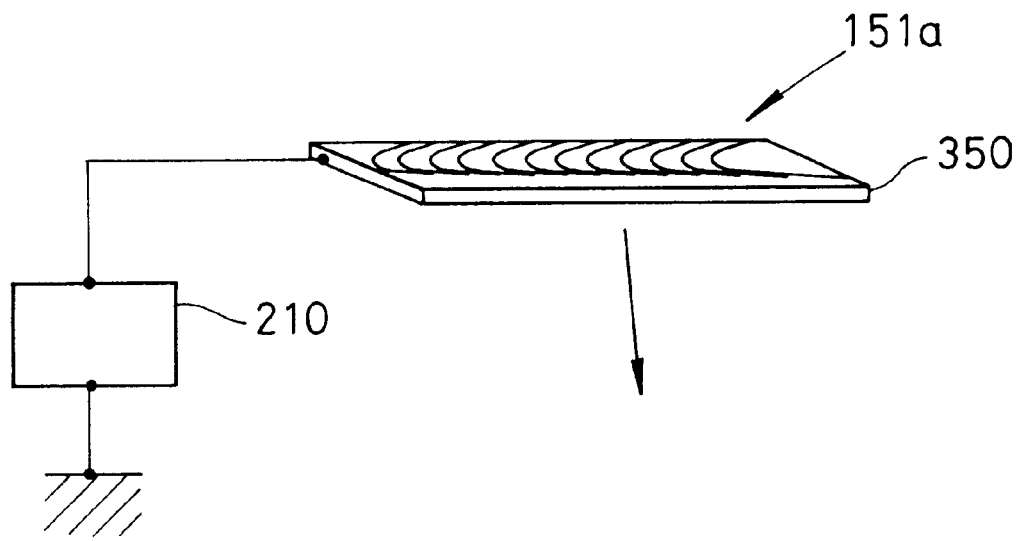
FIGS. 26A and 26B are schematic perspective views of another liquid crystal type holographic optical element according to a still further modification of the optical pickup apparatus embodying this invention.
Figure 26B:
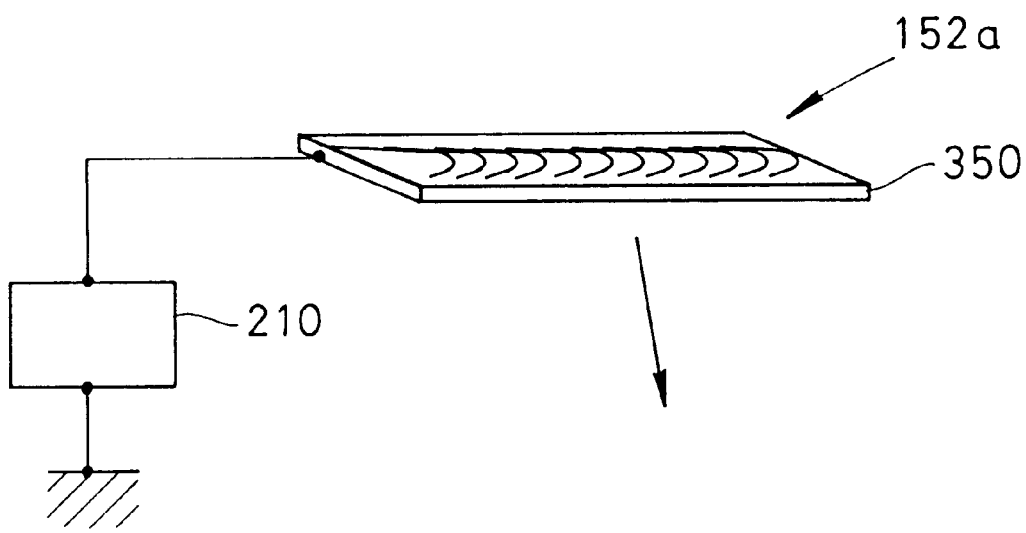

Further, the holographic optical elements can be implemented by electrically switching a liquid crystal device of a plane-parallel plate which can display a predetermined pattern as shown in FIGS. 26A and 26B. In other words, it is possible to make the first and second diffraction reliefs included in a single liquid crystal device 350. This single liquid crystal device 350 is the liquid crystal device 80 as shown in FIG. 27, which comprises a liquid crystal layer provided between a pair of plane-parallel plates of transparent materials and transparent electrodes formed in a matrix form on the inner surfaces of the plane-parallel plates. The matrix of transparent electrodes is connected to an electric circuit 210 which can selectively apply an electric field between the transparent electrodes for each of the first and second diffraction relief patterns 151a and 152a. The electric circuit 210 is controlled in such a way as to be switched to the first diffraction relief pattern 151a as shown in FIG. 26A in accordance with the selection of the semiconductor laser LD1 as the light source, thus allowing the return light to converge on the quarter-split light receiving surface PD1, or to be switched to the second diffraction relief pattern 152a as shown in FIG. 26B in accordance with the selection of the semiconductor laser LD2 as the light source, thereby permitting the return light to converge on the quarter-split light receiving surface PD2.

What is claimed is:

1. An optical pickup apparatus for reading recorded information from an optical recording medium, said optical pickup apparatus including and optical system which comprises:

light intensity detection means having quartered light receiving surfaces;

two semiconductor lasers for emitting light beams of different wavelengths;

an objective lens for directing each of said light beams onto an optical recording medium to form a light spot on a recording surface; and first and second holographic optical elements located between said quartered light receiving surfaces and said objective lens, wherein one of said two semiconductor lasers is arranged to direct the light beam to said first and second holographic optical elements in a manner that a main axis of said light beam is normal to said first and second holographic optical elements, and the other one of said two semiconductor lasers is arranged at a position that its light beam incident into said first and second holographic optical elements emerges therefrom at right angles; and wherein said first holographic optical element eliminates coma aberration and spherical aberration of a light beam of a first wavelength from said one of said semiconductor lasers, reflected by said recording surface, thereby generating a predetermined amount of astigmatism, and said second holographic optical element eliminates coma aberration and spherical aberration of a light beam of a second wavelength from the other one of said semiconductor lasers, reflected by said recording surface, thereby generating a predetermined amount of astigmatism.

2. The optical pickup apparatus according to claim 1, wherein said first and second holographic optical elements further each have a lens performance for converging a light beam, reflected by said recording surface, onto said quartered light receiving surfaces.

3. The optical pickup apparatus according to claim 1, wherein said first holographic optical element directly passes said light beam of said second wavelength without acting thereon, passes said light beam of said first wavelength launched from said one of said semiconductor lasers, guides zero-order diffraction light of said light beam to said objective lens, diffracts zero-order diffraction light of said first wavelength reflected by said recording surface, and guides first-order diffraction light, acquired by diffraction, to said quartered light receiving surfaces, and said second holographic optical element directly passes said light beam of said first wavelength without acting thereon, passes said light beam of said second wavelength launched from said other semiconductor laser, guides zero-order diffraction light of said light beam to said objective lens, diffracts said zero-order diffraction light of said second wavelength reflected by said recording surface, and guides first-order diffraction light, acquired by diffraction to said quartered light receiving surfaces.

4. The optical pickup apparatus according to claim 2, wherein said first holographic optical element directly passes said light beam of said second wavelength without acting thereon, passes said light beam of said first wavelength launched from said one of said semiconductor lasers, guides zero-order diffraction light of said light beam to said objective lens, diffracts zero-order diffraction light of said first wavelength reflected by said recording surface, and guides first-order diffraction light, acquired by diffraction, to said quartered light receiving surfaces, and said second holographic optical element directly passes said light beam of said first wavelength without acting thereon, passes said light beam of said second wavelength launched from said other semiconductor laser, guides zero-order diffraction light of said light beam to said objective lens, diffracts said zero-order diffraction light of said second wavelength reflected by said recording surface, and guides first-order diffraction light, acquired by diffraction, to said quartered light receiving surfaces.

5. The optical pickup apparatus according to claim 1, wherein said light intensity detection means has first quartered light receiving surfaces for receiving said light beam of said first wavelength and second quartered light receiving surfaces for receiving said light beam of said second wavelength;

said first holographic optical element diffracts zero-order diffraction light of said first wavelength reflected by said recording surface, and guides first-order diffraction light acquired by diffraction, to said first quartered light receiving surfaces; and said second holographic optical element diffracts zero-order diffraction light of said second wavelength reflected by said recording surface, and guides first-order diffraction light acquired by diffraction, to said second quartered light receiving surfaces.

6. The optical pickup apparatus according to claim 2, wherein said light intensity detection means has first quartered light receiving surfaces for receiving said light beam of said first wavelength and second quartered light receiving surfaces for receiving said light beam of said second wavelength;

said first holographic optical element diffracts zero-order diffraction light of said first wavelength reflected by said recording surface, and guides first-order diffraction light acquired by diffraction to said first quartered light receiving surfaces; and said second holographic optical element diffracts zero-order diffraction light of said second wavelength reflected by said recording surface, and guides first-order diffraction light acquired by diffraction, to said second quartered light receiving surfaces.

7. The optical pickup apparatus according to claim 3, wherein said light intensity detection means has first quartered light receiving surfaces for receiving said light beam of said first wavelength and second quartered light receiving surfaces for receiving said light beam of said second wavelength;

said first holographic optical element diffracts zero-order diffraction light of said first wavelength reflected by said recording surface, and guides first-order diffraction light acquired by diffraction, to said first quartered light receiving surfaces; and said second holographic optical element diffracts zero-order diffraction light of said second wavelength reflected by said recording surface, and guides first-order diffraction light acquired by diffraction, to said second quartered light receiving surfaces.

8. The optical pickup apparatus to claim 1, wherein said second holographic optical element directly passes said light beam of said first wavelength without acting thereon, diffracts said light beam of said second wavelength launched from said other semiconductor laser and guides negative first-order diffraction light of said light beam to said objective lens, diffracts said negative first-order diffraction light of said second wavelength reflected by said recording surface, and guides first-order diffraction light, acquired by diffraction, to said quartered light receiving surfaces.

9. The optical pickup apparatus according to claim 2, wherein said second holographic optical element directly passes said light beam of said first wavelength without acting thereon, diffracts said light beam of said second wavelength launched from said other semiconductor laser and guides negative first-order diffraction light of said light beam to said objective lens, diffracts said negative first-order diffraction light of said second wavelength reflected by said recording surface, and guides first-order diffraction light, acquired by diffraction, to said quartered light receiving surfaces.

10. The optical pickup apparatus according to claim 8, further comprising an aberration correcting element for correcting aberration included in negative first-order diffraction light acquired by diffracting said light beam of said second wavelength launched from said other semiconductor laser.

11. The optical pickup apparatus according to claim 9, further comprising an aberration correcting element for correcting aberration included in negative first-order diffraction light acquired by diffracting said light beam of said second wavelength launched from said other semiconductor laser.

12. The optical pickup apparatus according to claim 3, wherein said second holographic optical element directly passes said light beam of said first wavelength without acting thereon, diffracts said light beam of said second wavelength launched from said other semiconductor laser and guides negative first-order diffraction light of light beam to said objective lens, diffracts aid negative first-order diffraction light of said second wavelength reflected by said recording surface, and guides first-order diffraction light, acquired by diffraction, to said second quartered light receiving surfaces.

13. The optical pickup apparatus according to claim 1, wherein each of said first and second holographic optical elements comprises a diffraction relief formed on a transparent plane-parallel plate and an optical material filled in said diffraction relief and having a dispersion varying according to a wavelength.

14. The optical pickup apparatus according to claim 1, wherein said first and second holographic optical elements comprise first and second diffraction reliefs formed on inner surfaces of a pair of separate transparent plane-parallel plates set apart from each other, and an optical material filled between said first and second diffraction reliefs and having a dispersion varying according to a wavelength.

15. The optical pickup apparatus according to claim 1, wherein said first and second holographic optical elements are respectively first and second liquid crystal devices each including a pair of transparent plane-parallel plates, a liquid crystal layer provided between said plane-parallel plates, and transparent electrodes formed on inner surfaces of said plane-parallel plates as patterns of first and second diffraction reliefs, and an electric circuit capable of selectively applying an electric field to said transparent electrodes of said first and second liquid crystal devices is connected to said first and second liquid crystal devices.

16. The optical pickup apparatus according to claim 1, wherein said first and second holographic optical elements are a single liquid crystal device having first and second diffraction reliefs, said single liquid crystal device including a pair of transparent plane-parallel plates, a liquid crystal layer provided between said plane-parallel plates, and transparent electrodes formed in a matrix form on inner surfaces of said plane-parallel plates, and an electric circuit capable of selectively applying an electric field to said transparent electrodes for each of patterns of said first and second diffraction reliefs is connected to said single liquid crystal device.

* * * * *